United States Patent
Ohma et al.

(10) Patent No.: US 7,901,836 B2
(45) Date of Patent: Mar. 8, 2011

(54) POLYMER ELECTROLYTE FUEL CELL

(75) Inventors: Atsushi Ohma, Yokohama (JP); Shinji Yamamoto, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 902 days.

(21) Appl. No.: 11/791,679

(22) PCT Filed: Nov. 1, 2005

(86) PCT No.: PCT/JP2005/020083
§ 371 (c)(1),
(2), (4) Date: May 25, 2007

(87) PCT Pub. No.: WO2006/057139
PCT Pub. Date: Jun. 1, 2006

(65) Prior Publication Data
US 2007/0298304 A1    Dec. 27, 2007

(30) Foreign Application Priority Data

Nov. 25, 2004 (JP) .................. 2004-340318
Oct. 13, 2005 (JP) .................. 2005-299289

(51) Int. Cl.
*H01M 4/02* (2006.01)
(52) U.S. Cl. .......... 429/524; 429/523; 429/530; 429/534
(58) Field of Classification Search .................. 429/523, 429/524, 530
See application file for complete search history.

(56) References Cited

U.S. PATENT DOCUMENTS

| | | | |
|---|---|---|---|
| 5,882,810 A | 3/1999 | Mussell et al. | |
| 6,326,098 B1* | 12/2001 | Itoh et al. | 429/483 |
| 2002/0009626 A1 | 1/2002 | Terazono et al. | |
| 2002/0076582 A1 | 6/2002 | Reiser et al. | |
| 2004/0119056 A1* | 6/2004 | Hofmann et al. | 252/500 |
| 2005/0279643 A1* | 12/2005 | Gulla et al. | 205/264 |

FOREIGN PATENT DOCUMENTS

| | | |
|---|---|---|
| EP | 1 760 810 A1 | 3/2007 |
| JP | 6-103982 A | 4/1994 |
| JP | 6-150944 A | 5/1994 |
| JP | 9-265992 A | 10/1997 |
| JP | 10-189004 A | 7/1998 |
| JP | 11-312526 A | 9/1999 |

(Continued)

*Primary Examiner* — Patrick Ryan
*Assistant Examiner* — Muhammad Siddiquee
(74) *Attorney, Agent, or Firm* — Foley & Lardner LLP

(57) ABSTRACT

For a combination of a solid polymer electrolyte membrane 107, catalytic layers 111 and 113 disposed on both sides of the solid polymer electrolyte membrane 107, gas diffusion layers 112 and 114 disposed outside the catalytic layers 111 and 113, and separators 103 and 104 disposed outside the gas diffusion layers 112 and 114, the catalytic layer 113 to be cathode-sided includes a carbon carrier 117 composed of carbon having a mean lattice plane spacing $d_{002}$ of [002] planes calculated from an X-ray diffraction within a range of 0.343 nm to 0.358 nm, a crystallite size Lc within a range of 3 nm to 10 nm, and a specific surface area within a range of 200 m²/g to 300 m²/g, catalyst particles 115 containing platinum supported on the carbon carrier 117, and an electrolyte 116. According to the invention, a polymer electrolyte fuel cell is allowed to prevent a corroding deterioration of carbon carriers in the cathode catalytic layer in start and stop of the fuel cell, allowing for an enhanced stable output over a long term.

16 Claims, 10 Drawing Sheets

FOREIGN PATENT DOCUMENTS

| | | |
|---|---|---|
| JP | 2000-012043 A | 1/2000 |
| JP | 2000-268828 A | 9/2000 |
| JP | 2001-185158 A | 7/2001 |
| JP | 2001-357857 A | 12/2001 |
| JP | 2002-015745 A | 1/2002 |
| JP | 2002-164057 A | 6/2002 |
| JP | 2002-367655 A | 12/2002 |
| JP | 2003-187840 A | 7/2003 |
| JP | 2005-026174 A | 1/2005 |
| JP | 2005-270687 A | 10/2005 |
| JP | 2006-012449 A | 1/2006 |
| JP | 2006-012476 A | 1/2006 |

* cited by examiner

POLYMER ELECTROLYTE FUEL CELL

TECHNICAL FIELD

The present invention relates to a polymer electrolyte fuel cell.

BACKGROUND ART

The fuel cell is an apparatus that converts chemical energy of a fuel directly into electrical energy by no way through mechanical energy nor thermal energy, and is high in efficiency of power generation, and has, as the next-generation of power generating apparatus, great hopes put thereon.

As a fuel cell to be mounted on an automobile, a polymer electrolyte fuel cell using an ion exchange membrane is watched. For the polymer electrolyte fuel cell, the basic configuration and actions will be described.

The polymer electrolyte fuel cell is configured as a complex cell that has a plurality of laminated simplex cells (herein sometimes referred to as "single cells") to be fundamental units for power generation.

Each of the single cells has an MEA (membrane electrode assembly) that has a fuel electrode or positive electrode (hereinafter referred to as "anode") and an oxidant electrode or negative electrode (hereinafter referred to as "cathode") interposed on both sides of a solid polymer electrolyte membrane, respectively. Further, the single cell has an anode side separator and cathode side separator provided with gas channels and cooling water channels, outside the anode and the cathode, respectively.

The anode has a catalytic layer outside the solid polymer electrolyte membrane, and has a fuel gas diffusion layer outside it. The cathode also has a catalytic layer outside the solid polymer electrolyte membrane, and has an oxidant gas diffusion layer outside it.

In the polymer electrolyte fuel cell, a gaseous fuel (herein sometimes referred to as "fuel gas") containing hydrogen is supplied to the anode, where reactions of the following expression (1) occur in the catalytic layer, and a gaseous oxidant (herein sometimes referred to as "oxidant gas") containing oxygen is supplied to the cathode, where reactions of the following expression (2) occur in the catalytic layer.

$$H_2 \rightarrow 2H^+ + 2e^- \quad (1)$$

$$\tfrac{1}{2}O_2 + 2H^+ + 2e^- \rightarrow H_2O + Q \text{ (reaction heat)} \quad (2)$$

Therefore, every single cell of the fuel cell apparently has a reaction of the following expression (3) progressing therein.

$$H_2 + \tfrac{1}{2}O_2 \rightarrow H_2O + Q \quad (3)$$

This reaction accompanies a necessary electromotive force for movement of electron ($e^-$), which can be taken outside in the form of electrical energy.

As will be seen from the expression (1), the anode has hydrogen ions (protons) generated in the catalytic layer, which hydrogen ions move to the gas diffusion layer in the cathode via proton exchange groups in the solid polymer electrolyte membrane as a transmission medium. Proton exchange groups in the solid polymer electrolyte membrane have a decreased specific resistance as the electrolyte membrane has a saturating moisture content, acting as a proton-conductive electrolyte. Therefore, in order to keep the solid polymer electrolyte membrane in a water containing state, the reaction gas to be supplied to each single cell is humidified in advance. In each single cell, the solid polymer electrolyte membrane is thereby allowed for a suppressed evaporation of the moisture, with a resultant protection of the drying.

Further, as will be seen from the expression (3), the cathode has water produced in the catalytic layer as a power generating reaction is advanced in the fuel cell, and the produced water flows downstream in each single cell, together with oxidant gas. Therefore, by concurrent presence of such water that has been contained in oxidant gas for humidification of the solid polymer electrolyte membrane and such water that has been produced along with the power generating reaction, each single cell may tend to have an increased content of moisture residing in the downstream region. Thus, there is a possibility that this region may be over-saturated, generating droplets, and impeding a favorable diffusion of oxidant gas.

To this point, the oxidant gas to be supplied may have a reduced content of moisture for humidification to effect a decrease in total amount of residual moisture in the downstream region of each single cell, which may however be accompanied by a raised utilization of oxidant gas to increase the efficiency of power generation, yet with the possibility of producing much water in the catalytic layer, causing an over-saturation, generating droplets.

Accordingly, in each single cell, the catalytic layer may have a carbon carrier of a porous planer or particle shape carrying a platinum catalyst, and an intervenient electrolyte (e.g. PTTF, etc.) for provision of a water repellency thereto, to thereby prompt draining produced water or condensed water.

In addition, as will be seen from the expression (1), the fuel cell has in the startup a process of supplying a hydrogen gas as the fuel gas to the anode, where the anode may have $H_2$ and residual air mixed in the upstream and the downstream, forming to the anode a local cell (with an upstream anode and a downstream cathode). Then, the solid polymer electrolyte membrane neighboring the anode may have a deficient state of hydrogen ion at the downstream, with a resultant gradient of hydrogen ion concentration causing the solid polymer electrolyte membrane to have a lowered potential in the downstream. As a result, the solid polymer electrolyte membrane may have an increased potential difference to the catalytic layer at the cathode side, which may be accompanied by occurrences of such a corrosion of carbon carriers as shown by expressions (4) and (5) and such a melting of Pt as shown by an expression (6), in the catalytic layer at the cathode side.

$$C + 2H_2O \rightarrow CO_2 + 4H^+ + 4e^- \quad (4)$$

$$C + H_2O \rightarrow CO_2 + 2H^+ + 2e^- \quad (5)$$

$$Pt \rightarrow Pt^{2+} + 2e^- \quad (6)$$

Such phenomena may occur in a start of the fuel cell, as well as in a stop, with a yet accelerated tendency along repetition of start and stop operations of the fuel cell. Thus, there is a possibility that the performance of power generation may be reduced as the cell voltage decreases.

With such points in view, for the cathode's catalytic layer as a factor to determine the performance of power generation, besides the drainage, it has been desired to suppress the catalyst's activity reduction due to (platinum) catalyst elution and carbon carrier corrosion.

For an enhanced anti-corrosiveness of a carbon carrier, Japanese Patent Unexamined Publication No. 2005-26174 has disclosed a cathode catalytic layer, in which the carbon carrier has an increased degree of graphitization, and the specific surface area as well as the bulk density is set within a specified range.

On the other hand, for an enhanced activity of a platinum catalyst, Japanese Patent Unexamined Publication No.

H6-150944 has disclosed an electrode, in which the catalytic layer is double-layered, and a catalytic layer at the solid polymer electrolyte membrane side has a more increased amount of platinum catalyst than that at the gas diffusion layer side. Further, Japanese Patent Unexamined Publication No. H6-103982 has disclosed a fuel cell in which for a double-layered catalytic layer, in a catalytic layer at the solid polymer electrolyte membrane side, the amount of electrolyte is increased, or the amount of platinum catalyst is increased more than that in a catalytic layer at the gas diffusion side of electrode. In addition, in Japanese Patent Unexamined Publication No. H11-312526, there has been disclosed even an electrode in which, for a double-layered catalytic layer, the particle size of metal catalyst in a catalytic layer at the gas diffusion side of electrode is set as greater as 1.5 times or more than the particle size of metal catalyst in a catalytic layer at the solid polymer electrolyte side.

DISCLOSURE OF INVENTION

However, the use of a carbon carrier with a high degree of graphitization, though giving an enhanced anti-corrosiveness, accompanies a tendency for the carbon carrier to have a decreased specific surface area. Thus, there is a possibility that catalyst particles supported on a carbon carrier may be aggregated, with a reduced catalytic activity, causing the performance of power generation to be reduced.

Further, the catalytic layer which is double-layered by forming catalytic layers with different particle diameters or support amounts of catalyst particles to be supported on carbon carriers gives an improved power generation characteristic. However, the catalytic layer provides carbon carriers in a catalytic layer at the solid polymer electrolyte membrane side with a reduced anti-corrosiveness in comparison with a catalytic layer at the gas diffusion layer side. Thus, a dispersion in anti-corrosiveness of carbon carriers in the double-layered catalytic layer is occurred.

The present invention has been devised in view of the problems described.

To solve the problems, a polymer electrolyte fuel cell according to the present invention comprises: a solid polymer electrolyte membrane; catalytic layers disposed on both sides of the solid polymer electrolyte membrane; gas diffusion layers disposed outside the catalytic layers; and separators disposed outside the gas diffusion layers, wherein a cathode-sided catalytic layer comprises a carbon carrier comprising carbon having a mean lattice plane spacing $d_{002}$ of [002] planes calculated from an X-ray diffraction within a range of 0.343 nm to 0.358 nm, a crystallite size Lc within a range of 3 nm to 10 nm, and a specific surface area within a range of 200 m$^2$/g to 300 m$^2$/g, catalyst particles containing platinum supported on the carbon carrier, and an electrolyte.

BEST MODE FOR CARRYING OUT THE INVENTION

There will be described below a polymer electrolyte fuel cell according to an embodiment of the present invention, with reference to the accompanying drawings.

First Embodiment

Figure 1:
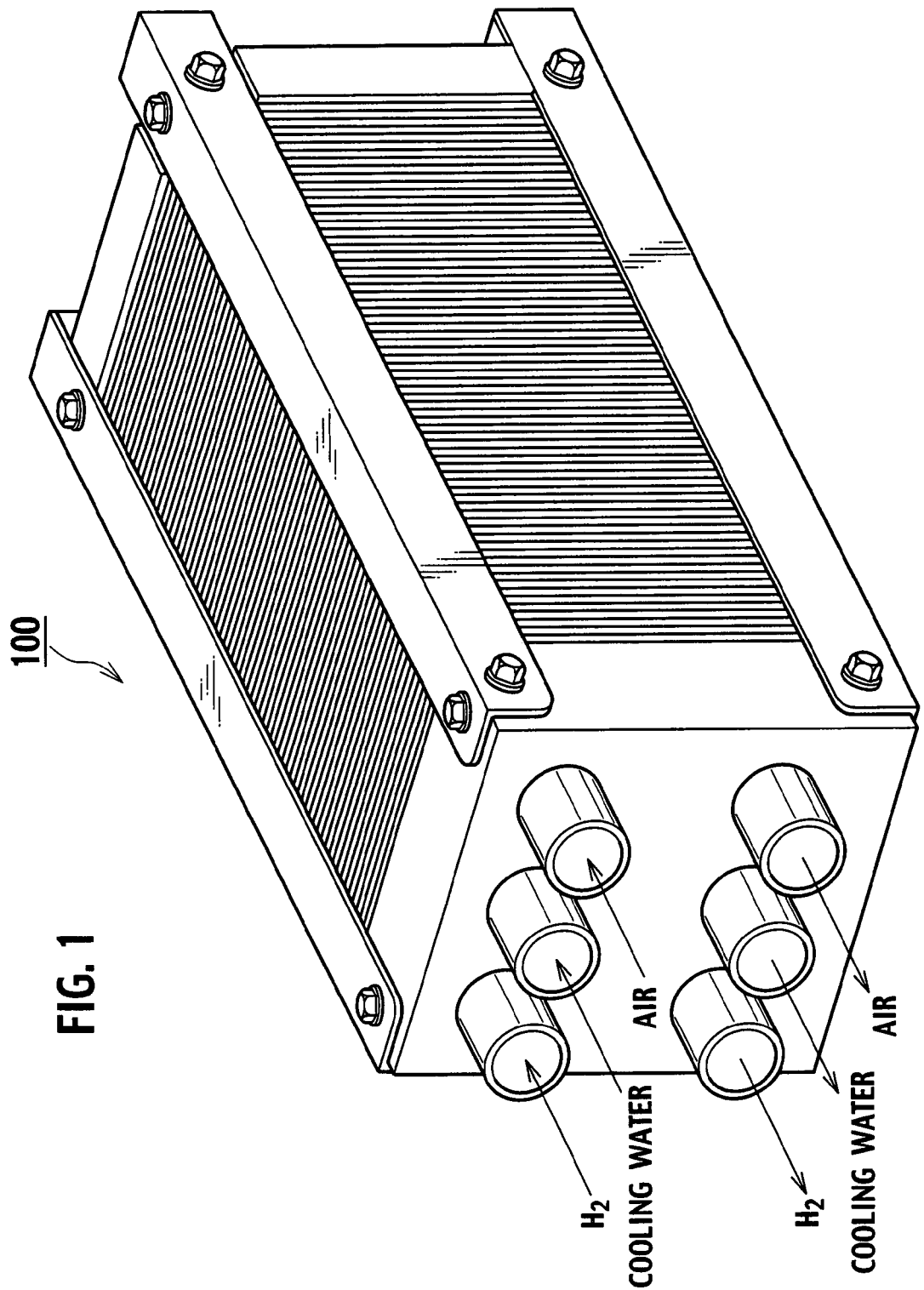
FIG. 1 is a perspective view of a fuel cell stack with a polymer electrolyte fuel cell according to an embodiment of the present invention.
Figure 2:
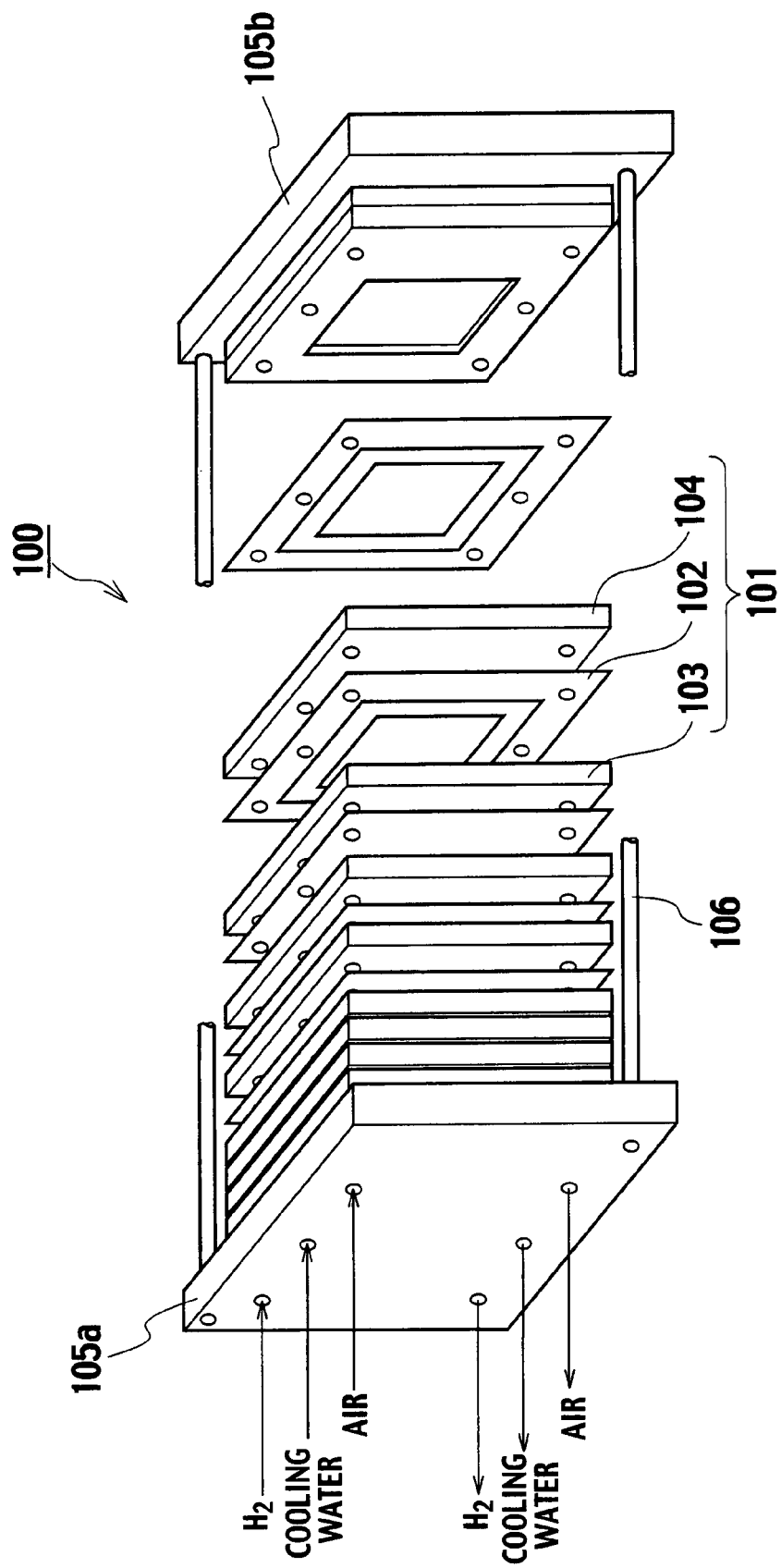
FIG. 2 is a schematic sectional view of the fuel cell stack shown in FIG. 1.

FIG. 1 is a perspective view of a fuel cell stack 100 with a polymer electrolyte fuel cell according to an embodiment of the present invention, and FIG. 2 schematically shows a partial section of the fuel cell stack 100. The fuel cell stack 100 is configured as a complex cell with a plurality of laminated single cells 101. The single cells 101 have an anode side separator 103 and a cathode side separator 104 residing on both sides of a membrane electrode assembly 102. The fuel cell stack 100 has end flanges 105a and 105b disposed at both ends of the plurality of laminated single cells 101, and is configured by fastening the outer peripheral parts with fastening bolts 106.

Figure 3:
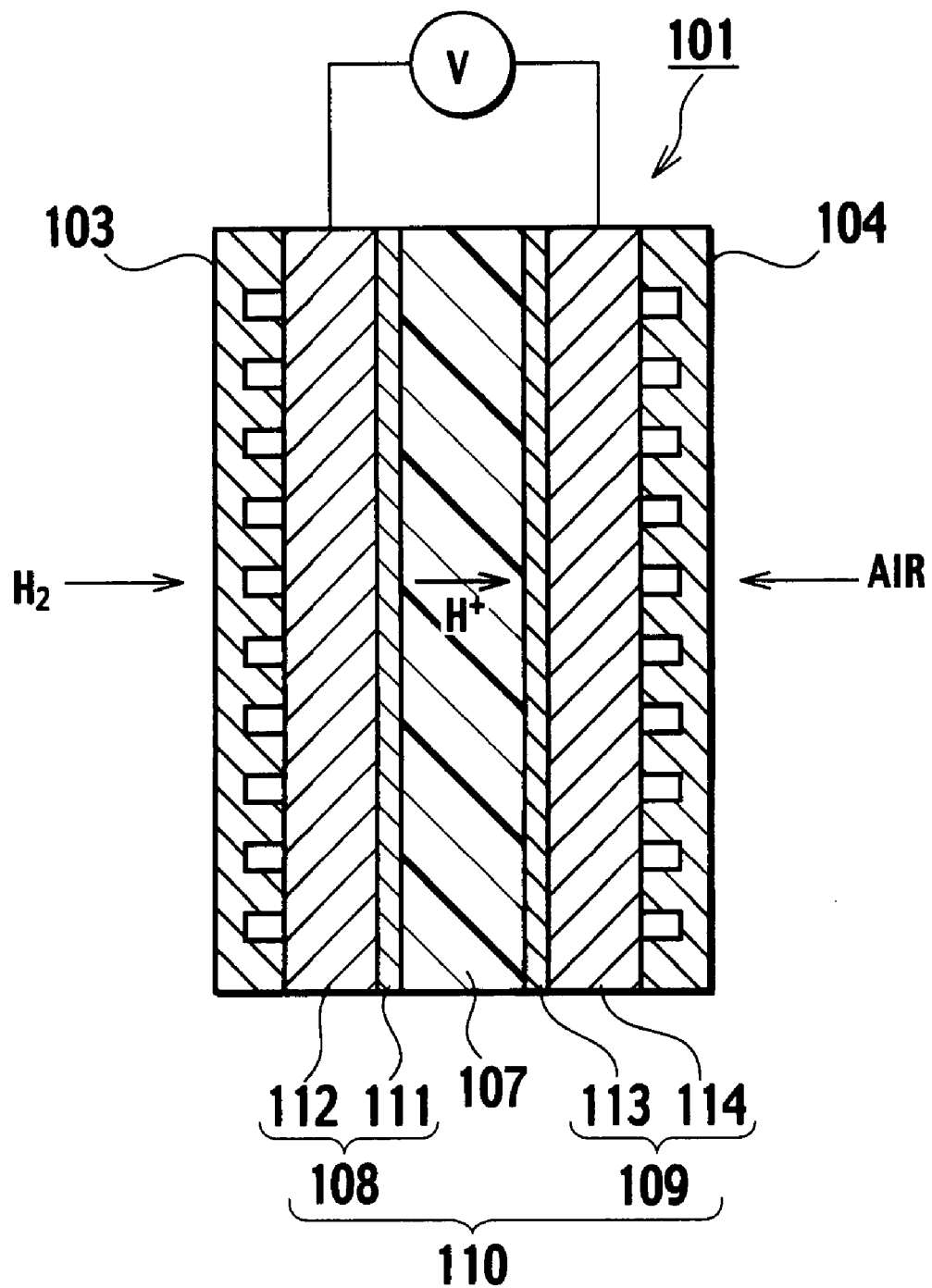
FIG. 3 is a sectional view of a single cell shown in FIG. 2.

In addition, FIG. 3 shows a section of a single cell 101. This single cell 101 is configured in the form of a membrane electrode assembly 110 with an anode 108 and a cathode 109 disposed on both sides of a solid polymer electrolyte membrane 107, respectively, and an anode side separator 103 and a cathode side separator 104 disposed outside the anode 108 and the cathode 109.

The anode 108 has a catalytic layer 111 on an outside of the solid polymer electrolyte membrane 107, and has a fuel gas diffusion layer 112 on an outside thereof. Also the cathode 109 has a catalytic layer 113 on an outside of the solid polymer electrolyte membrane 107, and has a gas diffusion layer 114 on an outside thereof.

Figure 4:
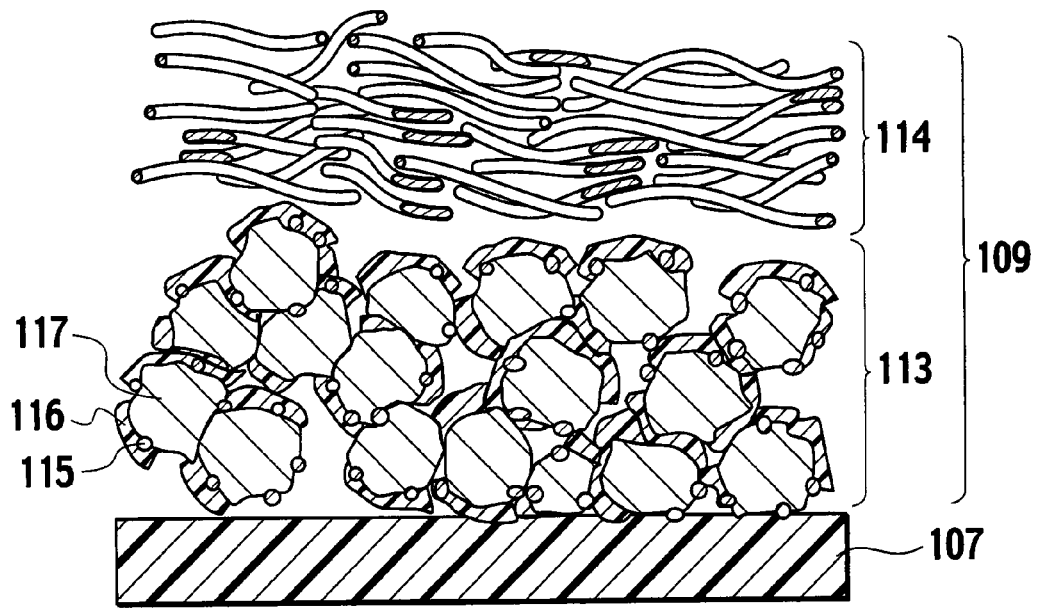
FIG. 4 is a partial enlarged sectional view of a periphery of a cathode shown in FIG. 3.
Figure 5:
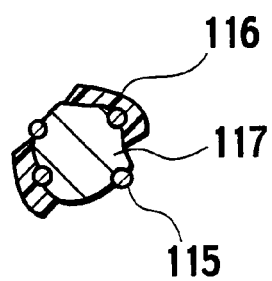
FIG. 5 is an enlarged sectional view of a carbon carrier in a cathode catalytic layer shown in FIG. 4.

Referring now to FIG. 4, this shows a partial enlarged section of the cathode 109 shown in FIG. 3. The cathode 109 has the cathode catalytic layer 113 and the gas diffusion layer 114 formed in order from the solid polymer electrolyte membrane 107 side. The cathode catalytic layer 113 has carbon carriers 117 supporting pluralities of catalyst particles 115 containing platinum (Pt) or platinum alloy thereon, as shown in FIG. 5, and is made in the form of carbon carriers 117 bonded by an electrolyte 116.

According this embodiment of the invention, carbon carriers 117 in the cathode catalytic layer 113 have a mean lattice plane spacing $d_{002}$ of [002] planes calculated from an X-ray diffraction within a range of 0.343 nm to 0.358 nm, a crystallite size Lc within a range of 3 nm to 10 nm, and a specific surface area within a range of 200 m²/g to 300 m²/g.

To specify the degree of graphitization of carbon carriers 117, first, for [002] planes calculated from an X-ray diffraction, the mean lattice plane spacing $d_{002}$ is defined within a range of 0.343 nm to 0.358 nm. In this respect, if the degree of graphitization of carbon carriers 117 becomes higher (if the mean lattice plane spacing $d_{002}$ becomes smaller than 0.343 nm), then carbon carriers 117 have a reduced specific surface area, with a resultant aggregation of catalyst particles 115 accompanied by enlargement of catalyst particles 115, causing an unfavorable dispersion of particles 115 being metal, so that catalyst particles 115 may have a reduced catalytic activity on oxygen. To the contrary, if the degree of graphitization of carbon carriers 117 becomes lower (if the mean lattice plane spacing $d_{002}$ of [002] planes exceeds 0.358 nm), then carbon carriers 117 tend to be corroded in start and stop of the fuel cell, so that the fuel cell may have a greatly reduced output in the start during a long-term service of the fuel cell.

Further, for carbon carriers 117, the crystallite size Lc is defined within a range of 3 nm to 10 nm. In this respect, if the crystallite size Lc of carbon carriers 117 becomes smaller than 3 nm, the degree of graphitization becomes too low for carbon carriers 117 to have anti-corrosiveness. To the contrary, if the crystallite size Lc of carbon carriers 117 exceeds 10 nm, then the degree of graphitization becomes high, and carbon carriers 117 have a remarkably reduced specific surface area, with a resultant aggregation of catalyst particles 115 giving an enlarged particle size, causing an unfavorable dispersion of catalyst particles 115, so that catalyst particles 115 may have a reduced catalytic activity on oxygen.

In addition, for carbon carriers 117, the specific surface area is defined within a range of 200 m²/g to 300 m²/g. In this respect, if the specific surface area of carbon carriers 117 becomes smaller than 200 m²/g, then in the case of an increased support amount of catalyst particles 115, the dispersion of catalyst particles 115 may be reduced. To the contrary, if the specific surface area of carbon carriers 117 exceeds 300 m²/g, then with a reduced anti-corrosiveness, and with an insufficient coverage of carbon carriers 117 by electrolyte 116, the amount of catalyst particles 115 unused for the reducing reaction of oxygen may be increased. Contrary thereto, by specification for the specific surface area of carbon carriers 9 to be within 200 m²/g to 300 m²/g, carbon carriers 117 are allowed to have pluralities of catalyst particles 115 uniformly dispersed and supported thereon, having catalyst particles 115 covered with electrolyte 116, so that the grain growth of catalyst particles 115 supported on carbon carriers 117 can be suppressed, allowing for a stable reaction activity of electrode over a long term.

For use as carbon carriers 117 meeting the above-noted conditions, it may be preferable to employ a carbon black having a mean particle size within a range of 12 nm to 25 nm, a bulk density within a range of 0.09 g/cm³ to 0.13 g/cm³, and an electrical resistivity within a range of 0.27 Ωcm to 0.33 Ωcm.

Further, for use as carbon carriers 117, it may be preferable to employ an acetylene black having a mean lattice plane spacing $d_{002}$ of [002] planes within a range of 0.343 nm to 0.355 nm, a crystallite size Lc within a range of 3 nm to 9 nm, a specific surface area within a range of 200 m²/g to 280 m²/g, a mean particle size within a range of 16 nm to 20 nm, a bulk density within a range of 0.10 g/cm³ to 0.12 g/cm³, and an electrical resistivity within a range of 0.29 to 0.32 Ωcm.

In addition, catalyst particles 115 may preferably occupy a proportion within a range of 30% to 70% in a mass conversion with respect to a total amount of catalyst particles 115 and carbon carriers 117 residing in the cathode catalytic layer 113, as shown by expression 1.

$$\text{Proportion of catalyst particles} = \text{mass of catalyst particles}/(\text{mass of catalyst particles} + \text{mass of carbon carriers}) \times 100 \quad (7)$$

In this respect, if the proportion of catalyst particles 115 becomes smaller than 30%, then with a reduced support amount of catalyst particles 115, the catalytic activity may go down, and to the contrary, if the proportion of catalyst particles 115 exceeds 70%, then the catalytic activity may be unsuccessfully increased for the increase in cost.

Further, carbon carriers 117 supporting catalyst particles 115 thereon may preferably have a specific surface area within a range of 60 m²/g to 200 m²/g. In this respect, if the specific surface area of carbon carriers 117 supporting catalyst particles 115 thereon becomes smaller than 60 m²/g, then with a reduced catalytic active site, the activity of catalyst may be reduced. To the contrary, if the specific surface area of carbon carriers 117 supporting catalyst particles 115 thereon exceeds 200 m²/g, then with an insufficient coverage of carbon carriers 117 by electrolyte 116, the amount of catalyst particles 115 unused for the reducing reaction of oxygen may be increased.

In addition, the solid polymer electrolyte membrane 107 and electrolyte 116 in the cathode catalytic layer 113 may preferably be composed of perfluorocarbon polymers having sulfonic acid groups.

Further, the cathode catalytic layer 113 may preferably have an average thickness ranging 6 μm to 15 μm. If the cathode catalytic layer 113 becomes thicker, then oxygen gas may be unsuccessfully diffused to catalyst particles 115 supported on carbon carriers 117 covered by electrolyte 116, and the cathode catalytic layer 113 may have residual water (condensed water of supplied water for humidification, and produced water) therein, with a resultant tendency to provide a reduced output due to a flooding in regions of high current density by residual water. As a result, carbon carriers 117 may fail to have anti-corrosiveness in start and stop of the fuel cell. To the contrary, if the cathode catalytic layer 113 becomes thinner, then with insufficient secured intervals of time for contact between catalyst particles 115 and oxygen gas, and with a decreased catalytic activity of oxygen, the fuel cell may have a greatly reduced output in power generation when used over a long term.

Concurrently with implementation of a specified thickness of the cathode catalytic layer 113, carbon carriers 117 supporting catalyst particles 115 thereon may preferably have a proportion of existence within a range of 50% to 80% with respect to a total mass in which carbon carriers 117 supporting catalyst particles 115 thereon and electrolyte 116 in the cathode catalytic layer 113 are summed up. If carbon carriers 117 supporting catalyst particles 115 thereon become smaller than a 50%, then the catalytic activity may be reduced. To the contrary, if carbon carriers 117 supporting catalyst particles 115 thereon exceed a 80%, then the quantity of electrolyte 116 may be too small to cover carbon carriers 117.

On the other hand, the anode catalytic layer 111 may preferably have an average thickness ranging 2 μm to 10 μm. If the thickness of anode catalytic layer 111 exceeds 10 μm, then the anode catalytic layer 111 may have an increased amount of residual water therein, with a resultant decrease in the amount of water to be diffused back from the cathode catalytic layer 113 through the solid polymer electrolyte membrane 107, and the cathode catalytic layer 113 may have a maintained amount of water retained therein. As a result, carbon carriers 117 in the cathode catalytic layer 113 may have a reduced anti-corrosiveness in start and stop of the fuel cell. To the contrary, if the anode catalytic layer 111 becomes smaller than a 2 μm, then with insufficient secured intervals of time for contact between catalyst particles and hydrogen gas, and with a decreased catalytic activity of hydrogen, as well as with an increased frequency of cycles between humidification and drying at the solid polymer electrolyte membrane 107 contacting the anode catalytic layer 111, the solid polymer electrolyte membrane 107 may have a reduced durability. Further, when the fuel cell is put in service over a long term, an output of power generation initially achieved in the operation may be greatly reduced.

Concurrently with implementation of a specified thickness of the anode catalytic layer 111, carbon carriers supporting catalyst particles thereon may preferably have a proportion of existence within a range of 50% to 80% with respect to a total mass in which carbon carriers supporting catalyst particles thereon and electrolyte are summed up. In the anode catalytic layer 111, if carbon carriers supporting catalyst particles thereon become smaller than a 50%, then the catalytic activity may go down. To the contrary, if carbon carriers supporting catalyst particles thereon exceed a 80% by weight, then carbon carriers may be unsuccessfully covered with electrolyte.

In addition, the anode catalytic layer 111 may preferably have an average thickness (Ya) thinner than an average thickness (Yc) of the cathode catalytic layer 113, and meet a relationship between Ya and Yc, such that Ya/Yc=0.1 to 0.6. If Ya/Yc becomes smaller than 0.1, then in the anode catalytic layer 111, with insufficient intervals of time for contact between catalyst particles and hydrogen gas, and with a decreased catalytic activity of hydrogen, or with an increased frequency of cycles between humidification and drying at the solid polymer electrolyte membrane 107 contacting the anode catalytic layer 111, the solid polymer electrolyte membrane 107 may have a reduced durability. If Ya/Yc exceeds 0.6, then with a decrease in the amount of water to be diffused back from the cathode catalytic layer 113 through the solid polymer electrolyte membrane 107, the cathode catalytic layer 113 may have an insufficiently reduced amount of water retained therein, so that carbon carriers in the cathode catalytic layer 113 may have a reduced anti-corrosiveness in start and stop of the fuel cell. As a result, in a long-term service of polymer electrolyte fuel cell, a cell output initially achieved in the operation may be greatly reduced. In addition, it is turned out that by provision of the anode catalytic layer 111 with an average thickness thinner than an average thickness of the cathode catalytic layer 113, when air-purging the anode in a start and a stop of the fuel cell, the amount of moisture in the cathode catalytic layer 113 can be reduced with ease, allowing for a facilitated drying. As the cathode catalytic layer 113 has a decreased amount of moisture, migration of water takes place from the side of solid polymer electrolyte membrane 107 having much moisture to the side of anode catalytic layer 111, and concurrently, water in cathode catalytic layer 113 vicinal to the solid polymer electrolyte membrane 107 or in vicinities of interfacial planes of both layers 111 and 113 moves to the side of solid polymer electrolyte membrane 107. Therefore, the cathode catalytic layer 113 has a decreased amount of retained water or residual moisture, with an improved drainage, so that, all the way from an initial phase of start to a post-endurance of the fuel cell, the gas diffusion and draining characteristics can be kept from turndown, with a resultant enhancement in power generation performance encompassing from a low current density up to a high current density, allowing for a maintained durability and implementation of an elongated service life.

Further, catalyst particles in the anode catalytic layer 111 and the cathode catalytic layer 113 may preferably be platinum (Pt) or a platinum alloy containing platinum (Pt), in view of power generation performance (hydrogen oxidation activity at the anode and oxygen reduction activity at the cathode) and endurance (suppression of Pt or additive component elution due to potential variation), and the platinum alloy may preferably contain a metal selected from among ruthenium (Ru), rhodium (Rh), palladium (Pd), iridium (Ir), osmium (Os), chromium (Cr), cobalt (Co), and nickel (Ni).

In addition, the mixing ratio of platinum and metal in the platinum alloy may preferably be set within a range of 3/1 to 5/1 in mole ratio (platinum/metal), in view of power generation performance and endurance. This is because, if the mole ratio (platinum/metal) exceeds 1/3, the solid solution of metal added to platinum may become insufficient, with a resultant elution of metal in potential variation, with a reduced endurance. To the contrary, if the mole ratio (platinum/metal) is smaller than 5/1, the variation in potential of platinum due to added component may become insufficient, with an unsuccessful enhancement of catalytic activity.

In addition, carbon carriers included in the anode catalytic layer 111 may preferably be low crystalline (amorphous material), and have a specific surface area within a range of 300 $m^2$/g to 1,500 $m^2$/g. Like this, provision of carbon carriers in the anode catalytic layer 111 with an enhanced hydrophilic property in comparison with carbon carriers 117 in the cathode catalytic layer 113 enables a promoted migration (back diffusion) of water from the side of solid polymer electrolyte membrane 107 where the amount of moisture is high to the anode side where it is low. Concurrently therewith, moisture in cathode vicinal to the solid polymer electrolyte membrane 107, i.e., in vicinities of an interfacial plane between cathode catalytic layer 113 and solid polymer electrolyte membrane 107 moves to the side of solid polymer electrolyte membrane 107, with a resultant enhancement of drainage. Therefore, all the way from an initial phase of start to a post-endurance of the fuel cell, the gas diffusion and draining characteristics can be kept from turndown, with a resultant enhancement in power generation performance encompassing from a low current density up to a high current density, allowing for a maintained durability and implementation of an elongated service life.

Description will be made by employing specific examples of embodiment, without intended restriction to the illustrative examples.

Embodiment Example 1

Fabrication of Anode Catalytic Layer

First, a carbon black (Ketjen Black International Ltd. make Ketjenblack™ EC, specific surface area BET=800 $m^2$/g, amorphous carbon) was prepared by 40 g, and 400 g of dinitro diammineplatinum solution (Pt concentration 1.0%) was added to that carbon black, which was stirred for one hour. Thereafter, 50 g of methanol was mixed thereto as a reducing agent, which was stirred for one hour, and then heated up to 80° C., stirred at 80° C. for six hours, and let to temperature-fall by one hour down to a room temperature. After a filtering of deposit, obtained solids were dried under a reduced pressure at 85° C. for 12 hours, and crushed in a mortar, obtaining carbon carriers supporting thereon 50 mass-% in Pt support concentration of Pt particles having an average particle size of 2.6 nm.

Next, to obtained carbon carriers having Pt particles supported thereon, 5 times their mass of purified water was added, and after five minutes of de-foaming operation under reduced pressure, 0.5 times their mass of n-propyl alcohol was added, and then a solution (Du Pont Ltd. make) containing 20 wt % Nafion® to be an electrolyte was added. The electrolyte used in the solution had been prepared with a ratio of mass of solids to mass of carbon carriers (carbon (carbon)/ionomer (electrolyte)) set to 1.0/0.9.

An obtained mixture as a slurry was dispersed with an ultrasonic homogenizer, and by application of a de-foaming operation under reduced pressure, a catalyst slurry was prepared. Prepared catalyst slurry was printed in a screen printing method on one side of a polytetrafluoroethylene seat, by an amount corresponding to a desirable thickness, and dried at 60° C. for 24 hours. By the screen printing method, anode catalytic layers were prepared, which had a size of 5 cm×5 cm. Further, an adjustment had been made for the layer coated on the polytetrafluoroethylene seat to have a Pt amount of 0.2 mg/cm$^2$ (for the anode catalytic layer to have an average thickness of 6 μm).

[Fabrication of Cathode Catalytic Layer]

First, a high crystallinity carbon (Denki Kagaku Kogyo Ltd. make acetylene black CA-200) was prepared, with a specific surface area BET of 216 m$^2$/g, a mean lattice plane spacing d$_{002}$ of 0.343 nm, and a crystallite size Lc of 8.3 nm.

Next, 4.0 g of high crystallinity carbon was added to 400 g of dinitro diammineplatinum solution (Pt concentration 1.0%), which was stirred for one hour, and thereafter, 50 g of formic acid was additionally mixed thereto as a reducing agent, which was stirred for one hour. Thereafter, it was heated up to 40° C. by 30 minutes, and stirred at 40° C. for six hours, and thereafter, heated up to 60° C. by 30 minutes, and additionally stirred at 60° C. for six hours, and was let to temperature-fall by one hour down to a room temperature. After a filtering of deposit, obtained solids were dried under a reduced pressure at 85° C. for 12 hours, and crushed in a mortar, obtaining carbon carriers supporting thereon 50 mass-% in Pt support concentration of Pt particles having an average particle size of 4.8 nm.

Next, to carbon carriers having Pt particles supported thereon, 5 times their mass of purified water was added, and after five minutes of de-foaming operation under reduced pressure, 0.5 times their mass of n-propyl alcohol was added. Thereafter, a solution (Du Pont Ltd. make with 20 wt % Nafion®) containing a proton-conductive polymer electrolyte was additionally added. The content of polymer electrolyte used in the solution had been prepared with a ratio of mass of solids to mass of carbon in catalysts of cathode electrode set for carbon/ionomer=1.0/0.9.

A mixture obtained as a slurry was dispersed with an ultrasonic homogenizer, and by application of a de-foaming operation under reduced pressure, a catalyst slurry was prepared. This catalyst slurry was printed in a screen printing method on one side of a polytetrafluoroethylene seat, by an amount corresponding to a desirable thickness, and dried at 60° C. for 24 hours. By the screen printing method, cathode catalytic layers were prepared, which had a size of 5 cm×5 cm. Further, an adjustment had been made for the layer coated on the polytetrafluoroethylene seat to have a Pt amount of 0.4 mg/cm$^2$ (for the cathode catalytic layer to have an average thickness of 12 μm).

[Fabrication of Membrane Electrode Assembly]

Using Nafion™111 (membrane thickness 25 μm) as a solid polymer electrolyte membrane, the solid polymer electrolyte membrane (Nafion™111) was superposed on an anode catalytic layer formed on a polytetrafluoroethylene seat, and in addition, a cathode catalytic layer formed on a polytetrafluoroethylene seat was superposed in a laminating manner. Subsequently, after 10 minutes of hot pressing at 130° C. under 2.0 MPa, the polytetrafluoroethylene seats was peeled off, to provide a membrane electrode assembly.

On the solid polymer electrolyte membrane, there was a transferred cathode catalytic layer, which had a thickness of about 12 μm, and a Pt support amount of 0.4 mg per 1 cm$^2$ apparent electrode area, while the electrode area was 25 cm$^2$. An anode catalytic layer had a thickness of about 6 μm, and a Pt support amount of 0.2 mg per 1 cm$^2$ apparent electrode area, while the electrode area was 25 cm$^2$.

For the membrane electrode assembly obtained, a performance was evaluated as follows.

On both sides of the membrane electrode assembly, gas diffusion layers of a carbon paper (size: 6.0 cm×5.5 cm, thickness: 320 μm) and gas-separating separators formed with gas channels were arranged, respectively, which was sandwiched by gold-plated stainless steel electricity collectors to provide a unit sell for evaluation.

To the single cell for the evaluation, hydrogen gas was supplied as a fuel at the anode side, and air was supplied as an oxidant at the cathode side. Both gases of atmospheric air and hydrogen gas had atmospheric pressures as their supply pressures, the hydrogen gas being 58.6° C. in temperature and 60% in relative humidity, and the air, 54.8° C. in temperature and 50% in relative humidity, while the cell temperature was 70° C. Further, the rate of use of hydrogen was set to 67%, and the rate of use of air was set to 40%. Under this condition, electric power was generated with a current density of 1.0 A/cm$^2$, when the cell voltage was measured as an initial cell voltage.

After a subsequent power generation of 60 seconds, the power generation was stopped. After the stop of power generation, the supply of hydrogen as well as that of air was stopped, and for a displacement of hydrogen gas, air was supplied by 0.1 L/min at the anode side, which was followed by a waiting interval of 50 seconds. Then, at the anode side, hydrogen gas was supplied by 0.05 L/min. Thereafter, under like conditions to the foregoing, hydrogen gas was supplied at the anode side, and air, at the cathode side, and power generation was again performed with a current density of 1.0 A/cm$^2$ for 60 seconds. Further, in this time, the load current was increased from 0 A/cm$^2$ to 1 A/cm$^2$ by 30 seconds. Exercising such start and stop of power generation, cell voltages were measured for the evaluation of power generation performance. More specifically, when a cell voltage of 0.45V was given by a current density of 1.0 A/cm$^2$, the number of cycles was taken as an evaluation value of durability.

Embodiment Example 2

For an embodiment example 2, a single cell for evaluation was fabricated by using like method to the embodiment example 1, subject to a change of carbon carriers supporting catalyst particles thereon in a cathode catalytic layer.

First, a high crystallinity carbon (Denki Kagaku Kogyo Ltd. make acetylene black CA-250) was prepared, with a specific surface area BET of 264 m$^2$/g, a mean lattice plane spacing d$_{002}$ of 0.355 nm, and a crystallite size Lc of 3.6 nm.

To 4.0 g of this high crystallinity carbon, 400 g of dinitro diammineplatinum solution (Pt concentration 1.0%) was added, which was stirred for one hour. In addition, 50 g of formic acid was mixed thereto as a reducing agent, which was stirred for one hour, and thereafter, it was heated up to 40° C. by 30 minutes, and stirred at 40° C. for six hours. After a heating up to 60° C. by 30 minutes followed by an additional stirring at 60° C. for six hours, it was let to temperature-fall by one hour down to a room temperature. After a filtering of deposit, obtained solids were dried under a reduced pressure at 85° C. for 12 hours, and crushed in a mortar, obtaining carbon carriers supporting thereon Pt particles with an average particle size of 3.5 nm, and a Pt support concentration of 50 mass-%.

Embodiment Example 3

For an embodiment example 3, a single cell for evaluation was fabricated by using like method to the embodiment example 1, subject to a change of carbon carriers supporting catalyst particles thereon in a cathode catalytic layer.

First, a graphitized Ketjenblack was prepared with a specific surface area BET of 200 m$^2$/g, a mean lattice plane spacing $d_{002}$ of 0.343 nm, and a crystallite size Lc of 3.9 nm.

To 4.0 g of this graphitized Ketjenblack, 400 g of dinitro diammineplatinum solution (Pt concentration 1.0%) was added, which was stirred for one hour. In addition, 50 g of formic acid was mixed thereto as a reducing agent, which was stirred for one hour, and thereafter, it was heated up to 40° C. by 30 minutes, and stirred at 40° C. for six hours. After a heating up to 60° C. by 30 minutes followed by an additional stirring at 60° C. for six hours, it was let to temperature-fall by one hour down to a room temperature. After a filtering of deposit, obtained solids were dried under a reduced pressure at 85° C. for 12 hours, and crushed in a mortar, obtaining carbon carriers supporting thereon Pt particles with an average particle size of 5.5 nm, and a Pt support concentration of 50 mass-%.

Comparative Example 1

For a comparative example 1, an MEA was fabricated, like the embodiment example 1, subject to an alteration of carbon carriers in a cathode catalytic layer to a Ketjen Black International Ltd. make Ketjenblack™ EC.

Embodiment Examples 4 to 10, and Comparative Example 2 to 3

For embodiment examples 4 to 10, the MEA was configured with a double-layered cathode catalytic layer 1. Embodiment examples 4 to 6 as well as comparative example 2 and comparative example 3 correspond to a second embodiment to be described later, embodiment example 7, to a third embodiment, embodiment examples 8, to a fourth embodiment, and embodiment example 9, to a fifth embodiment. For any of them, the MEA was fabricated by using like method to the embodiment example 1.

For the embodiment examples and comparative examples, the properties of employed carbon carriers in cathode and anode are listed in Table 1, and the evaluation results of power generation performance are listed in Table 2.

TABLE 1

| | | Cathode Catalytic Layers | | | | |
|---|---|---|---|---|---|---|
| | | Carbon carriers | | | | |
| | Kinds | Mean latice plane spacings d002 [nm] | Crystallite sizes Lc [nm] | Specific surface areas [m$^2$/g] | Ave. Pt particle sizes [nm] | Average thickness [μm] |
| Emb. Ex. 1 | Acetylene black (CP200) | 0.343 | 8.3 | 216 | 4.8 | 12.0 |
| Emb. Ex. 2 | Acetylene black (CP250) | 0.355 | 3.6 | 264 | 3.5 | 12.0 |
| Emb. Ex. 3 | Graphitized Ketjenblack | 0.343 | 3.9 | 200 | 5.5 | 12.0 |
| Emb. Ex. 4 | Ketjenblack (1st layer) | — | — | 800 | 2.6 | 6.0 |
| | Acetylene black (CP200)(2nd layer) | 0.343 | 8.3 | 216 | 4.8 | 6.0 |
| Emb. Ex. 5 | Ketjenblack (1st layer) | — | — | 800 | 2.6 | 6.0 |
| | Acetylene black (CP250)(2nd layer) | 0.355 | 3.6 | 264 | 3.5 | 6.0 |
| Emb. Ex. 6 | Ketjenblack (1st layer) | — | — | 800 | 2.6 | 6.0 |
| | Graphitized Ketjenblack (2ndt layer) | 0.343 | 3.9 | 200 | 5.5 | 6.0 |
| Emb. Ex. 7 | Ketjenblack (1st layer) | — | — | 800 | 2.6 | 6.0 |
| | Graphitized Ketjenblack (2ndt layer) | 0.343 | 3.9 | 200 | 5.5 | 6.0 |
| Emb. Ex. 8 | Ketjenblack (1st layer) | — | — | 800 | 7.3 (PtCo) | 6.0 |
| | Graphitized Ketjenblack (2ndt layer) | 0.343 | 3.9 | 200 | 5.5 | 10.0 |
| Emb. Ex. 9 | Ketjenblack (1st layer) | — | — | 800 | 2.6 | 6.0 |
| | Acetylene black (CP250)(2nd layer) | 0.355 | 3.6 | 264 | 3.5 | 6.0 |
| Emb. Ex. 10 | Ketjenblack (1st layer) | — | — | 800 | 2.6 | 6.0 |
| | Graphitized Ketjenblack (2ndt layer) | 0.343 | 3.9 | 200 | 5.5 | 6.0 |
| Comp. Ex. 1 | Ketjenblack | — | — | 800 | 2.6 | 6.0 |
| Comp. Ex. 2 | Ketjenblack (1st layer) | — | — | 800 | 2.6 | 6.0 |
| | Vulcan (2nd layer) | — | — | 275 | 3.4 | 6.0 |
| Comp. Ex. 3 | Ketjenblack (1st layer) | — | — | 800 | 2.6 | 6.0 |
| | Black pearl (2nd layer) | — | — | 1550 | 2.4 | 6.0 |

| | | Anode Catalytic Layers | | |
|---|---|---|---|---|
| | | Carbon carriers | | |
| | Kinds | Specific surface areas [m$^2$/g] | Ave. Pt particle sizes [nm] | Average thickness [μm] |
| Emb. Ex. 1 | Ketjenblack | 800 | 2.6 | 6.0 |
| Emb. Ex. 2 | Ketjenblack | 800 | 2.6 | 6.0 |
| Emb. Ex. 3 | Ketjenblack | 800 | 2.6 | 6.0 |

TABLE 1-continued

|         | Carrier | Temp | Value1 | Value2 |
|---------|---------|------|--------|--------|
| Emb. Ex. 4 | Ketjenblack | 800 | 2.6 | 6.0 |
|         | Ketjenblack | 800 | 2.6 | 6.0 |
| Emb. Ex. 5 | Ketjenblack | 800 | 2.6 | 6.0 |
|         | Ketjenblack | 800 | 2.6 | 6.0 |
| Emb. Ex. 6 | Ketjenblack | 800 | 2.6 | 6.0 |
|         | Ketjenblack | 800 | 2.6 | 6.0 |
| Emb. Ex. 7 | Ketjenblack | 800 | 2.6 | 6.0 |
|         | Ketjenblack | 800 | 2.6 | 6.0 |
| Emb. Ex. 8 | Ketjenblack | 800 | 2.6 | 6.0 |
|         | Ketjenblack | 800 | 2.6 | 6.0 |
| Emb. Ex. 9 | Ketjenblack | 800 | 2.6 | 6.0 |
|         | Ketjenblack | 800 | 2.6 | 6.0 |
| Emb. Ex. 10 | Ketjenblack | 800 | 2.6 | 6.0 |
|         | Ketjenblack | 800 | 2.6 | 6.0 |
| Comp. Ex. 1 | Ketjenblack | 800 | 2.6 | 12.0 |
| Comp. Ex. 2 | Ketjenblack | 800 | 2.6 | 6.0 |
| Comp. Ex. 3 | Ketjenblack | 800 | 2.6 | 6.0 |

TABLE 2

|         | Durability (cycles) |
|---------|---------------------|
| Emb. Ex. 1 | 1,760 |
| Emb. Ex. 2 | 1,630 |
| Emb. Ex. 3 | 1,950 |
| Emb. Ex. 4 | 1,870 |
| Emb. Ex. 5 | 1,920 |
| Emb. Ex. 6 | 2,050 |
| Emb. Ex. 7 | 2,190 |
| Emb. Ex. 8 | 2,250 |
| Emb. Ex. 9 | 2,280 |
| Emb. Ex. 10 | 2,310 |
| Comp. Ex. 1 | 450 |
| Comp. Ex. 2 | 650 |
| Comp. Ex. 3 | 540 |

As shown in the Table 2, for MEA's fabricated in the embodiment examples and the comparative examples, their start-stop cycles were compared, with a resultant verification of a higher start-stop duration, as the MEA employed in its cathode catalytic layer an electrode catalyst with a higher crystallinity carbon carrier supporting a platinum catalyst component thereon.

Second Embodiment

Embodiment Examples 4 to 6, and Comparative Examples 2 to 3)

Figure 6:
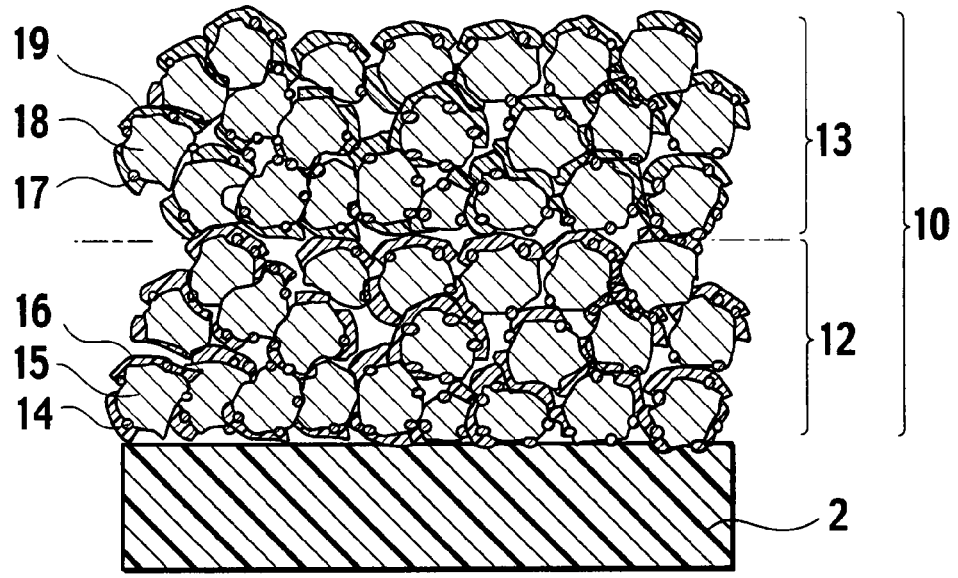
FIG. 6 is an enlarged sectional view of a cathode catalytic layer according to a second embodiment of the present invention.

For a second embodiment, the cathode catalytic layer is double-layered, and respective catalytic layers have their carbon carriers different in material. FIG. 6 is an enlarged sectional view of a catalytic layer 10 in a cathode. The cathode catalytic layer 10 has a double-layered structure with a first catalytic layer 12 and a second catalytic layer 13, the first catalytic layer 12 neighboring a solid polymer electrolyte membrane 2.

The first catalytic layer 12 is composed of an amorphous carbon 15 supporting platinum (Pt) particles 14 thereon, with intervening electrolyte 16, having a support amount of Pt particles 14 set to 0.2 mg/cm$^2$, where the support amount of Pt particles means the amount of supported Pt particles per unit area. On the other hand, the second catalytic layer 13 is composed of a high-crystallinity carbon 18 supporting Pt particles 17 thereon, with intervening electrolyte 19, having a support amount of Pt particles 17 set to 0.2 mg/cm$^2$ like the first catalytic layer 12.

It is noted that the combination of carbon carriers using an amorphous carbon 17, such as a Ketjenblack, and a high-crystallinity carbon 18, such as an acetylene black or graphitized Ketjenblack, is not limited thereto, providing that carbon carriers in the second catalytic layer 13 are excellent in oxidizing (corroding) potential or anti-corrosiveness, in comparison with carbon carriers in the first catalytic layer 12.

Figure 7:
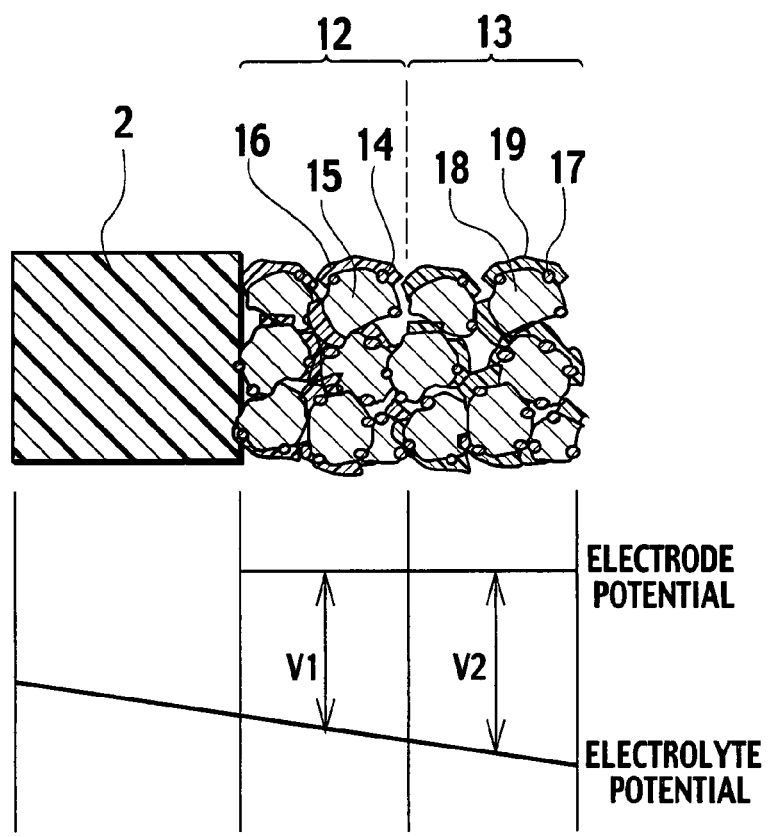
FIG. 7 is a diagram describing a potential distribution in a vicinity of a cathode in a single cell, in a start of the fuel cell.

FIG. 7 is a diagram describing potential distributions in a vicinity of a cathode 4 of a single cell 1 in a start of a fuel cell.

When the fuel cell is generating electric power, protons (H$^+$) run from the anode side of the solid polymer electrolyte membrane 2 toward the cathode side, and for electrolyte of the solid polymer electrolyte membrane 2 as well as electrolyte 16 in the catalytic layer 12 and electrolyte 19 in the catalytic layer 13, the electric potentials decrease along flux of protons (H$^+$). In this situation, at the cathode, the second catalytic layer 13 has a lower electrolyte potential in comparison with the first catalytic layer 12. This phenomenon is not restrictive to the start of fuel cell, and takes place when protons (H$^+$) move from the anode toward the cathode. Further, for the first catalytic layer 12 and the second catalytic layer 13 electrochemically contacting each other, the movements of electrons are very fast, so that their electrode potentials are equivalent. Thus, the first catalytic layer 12 and the second catalytic layer 13 have an equal electrode potential, and the second catalytic layer 13 has a lower electrolyte potential than the first catalytic layer 12, whereby for voltages (potential differences) imposed across the catalytic layers 12 and 13, the voltage (potential difference) V2 is greater than V1, as shown in FIG. 7. For un-corrosion of carbon carrier, this has an increased tendency in particular when exposed to high voltages, and carbon carriers have a higher tendency to corrode in the second catalytic layer 13 than in the first catalytic layer 12.

According to the present embodiment using in a second catalytic layer a high-crystallinity carbon such as an acetylene black or graphitized Ketjenblack, the second catalytic layer has an increased oxidizing potential in comparison with a first catalytic layer using an amorphous carbon, allowing for an enhanced anti-corrosiveness over an entirety of the cathode. Further, when compared with a case using high-anticorrosive carbon carriers in both first catalytic layer and second catalytic layer, the three-phased interfaces are likely to be optimized, allowing for a raised voltage, as an advantage.

Third Embodiment

Embodiment Example 7

For a third embodiment, the cathode catalytic layer is double-layered, and respective catalytic layers have their carbon carriers different in ion exchange capacity. It is noted that, relative to FIG. 6, like locations are designated by like reference chanters, omitting the description.

Figure 8:
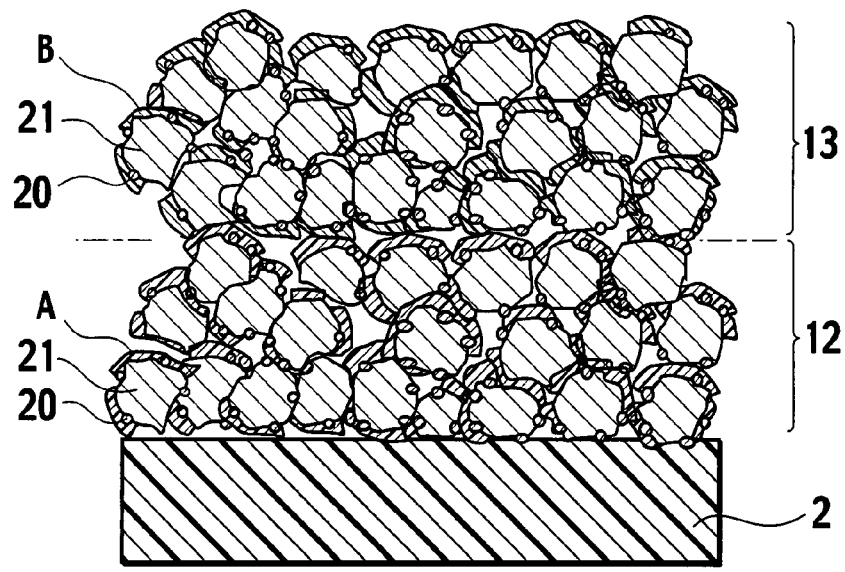
FIG. 8 is an enlarged sectional view of a cathode catalytic layer according to a third embodiment of the present invention.

FIG. 8 is an enlarged sectional view of a cathode catalytic layer according to the third embodiment. The cathode catalytic layer 10 is configured with a first catalytic layer 12 and a second catalytic layer 13. The first catalytic layer 12 is composed of an amorphous carbon 21 supporting Pt particles 20 thereon, with intervening electrolyte A. On the other hand, the second catalytic layer 13 is composed of a high-crystallinity carbon (graphitized Ketjenblack) 21 supporting Pt particles 20 thereon, with intervening electrolyte B. The electrolyte A and the electrolyte B have their ion exchange capacities (amounts of protons in the electrolytes) set to 0.9 meq/g and 1.2 meq/g, respectively, the electrolyte B having a greater ion exchange capacity than the electrolyte A. The Pt support amount is set to 0.2 mg/cm$^2$ for the first catalytic layer 12 and the second catalytic layer 13. The amount of electrolyte is defined in terms of a mass ratio to Pt amount, and for the first catalytic layer 12, electrolyte A=1:1 mixture, and for the second catalytic layer 13, electrolyte B=1:0.9 mixture. It is noted that the ratio of electrolyte amount and Pt amount is an illustrative example, and not limited thereto. For electrolyte amount, the definition is made to Pt amount, while the electrolyte amount may be defined to the mass of carriers.

The second catalytic layer 13 has an increased tendency for corrosion by oxidation in comparison with the first catalytic layer 12, and the ion exchange capacity of electrolyte B in the second catalytic layer 13 is set greater relative to electrolyte A in the first catalytic layer 12.

Figure 9:
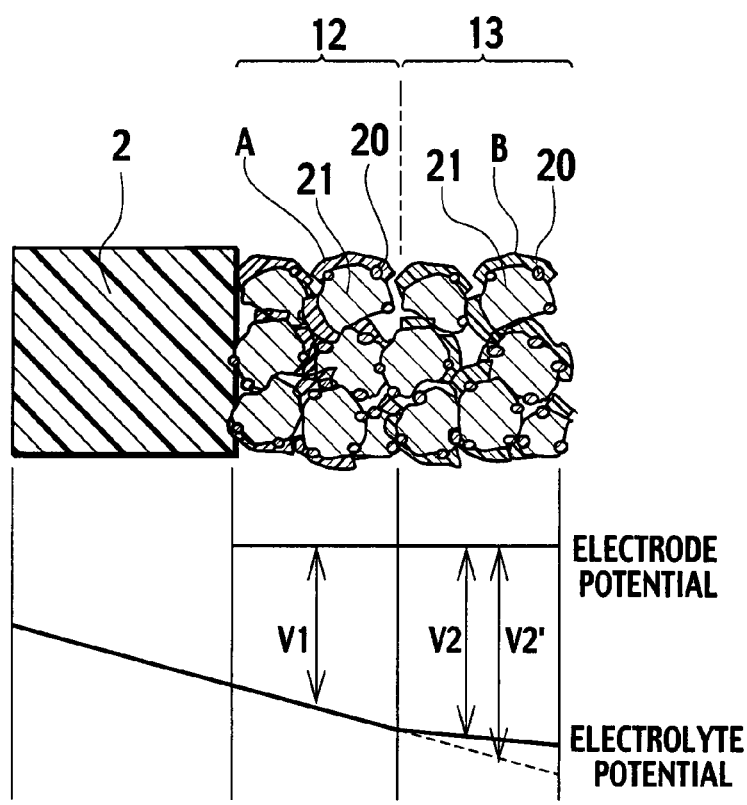
FIG. 9 is a diagram illustrating a potential distribution in a sectional direction in a vicinity of the cathode, in power generation of the fuel cell.

FIG. 9 shows potential distributions in a sectional direction in a vicinity of a cathode 4 in a start of a fuel cell. Using electrolyte B in the second catalytic layer 13 allows for a suppressed potential reduction (V2<V2') of electrolyte in comparison with the case of using electrolyte A. Accordingly, in the second catalytic layer 13, corrosion of carbon carriers can be suppressed. In addition, the second catalytic layer 13 may have a reduced mixing amount of electrolyte B, thereby allowing for a suppressed flooding in the cathode 4, in particular at the first catalytic layer 12.

According to the present embodiment, first and second catalytic layers have different electrolytes, thereby allowing for a reduced voltage drop due to a flooding, an enhanced power generation performance, and an excellent durability of the fuel cell.

Fourth Embodiment

Embodiments Example 8

For a fourth embodiment, the cathode catalytic layer is double-layered, and respective catalytic layers have their support amounts of catalyst particles different in between. It is noted that, relative to FIG. 6, like locations are designated by like reference chanters, omitting the description.

Figure 10:
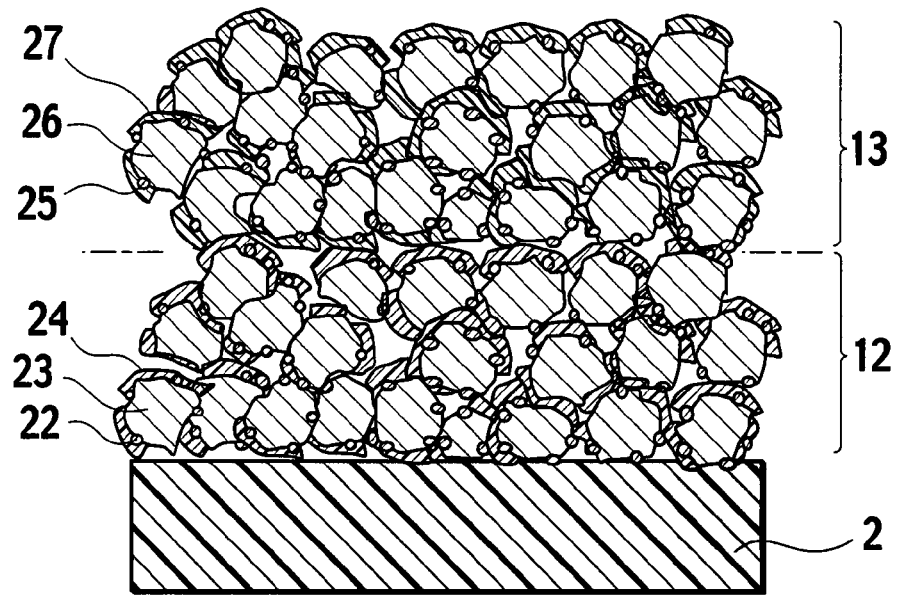
FIG. 10 is an enlarged sectional view of a cathode catalytic layer according to a fourth embodiment of the present invention.

FIG. 10 is a sectional view of a cathode catalytic layer according to the fourth embodiment. The cathode catalytic layer 10 is configured with a first catalytic layer 12 and a second catalytic layer 13. The first catalytic layer 12 is composed of an amorphous carbon 23 supporting Pt—Co alloy particles 22 thereon, with intervening electrolyte 24, having a Pt support amount set to 0.2 mg/cm$^2$. On the other hand, the second catalytic layer 13 is composed of a high-crystallinity carbon (graphitized Ketjenblack) 26 supporting Pt particles 25 thereon, with intervening electrolyte 27, having a Pt support amount set to 0.3 mg/cm$^2$, so that the Pt support amount in the second catalytic layer 13 is greater in comparison with the first catalytic layer 12.

It is noted that here is taken an illustrative example using Pt—Co alloy particles 22 and Pt particles 25, which constitutes no restriction to catalyst particles, providing that catalyst particles in the second catalytic layer 13 have a higher oxidizing potential in comparison with catalyst particles in the first catalytic layer 12.

The cathode catalytic layer has potential distributions similar to the distributions described with reference to FIG. 7. Metallic catalyst (Pt) of the second catalytic layer 13 may have a greater oxidizing potential in comparison with metallic catalyst (Pt—Co alloy) in the first catalytic layer 12, to thereby allow for an enhanced anti-corrosiveness in the second catalytic layer 13. Further, the second catalytic layer 13 may have an increased Pt support amount in comparison with Pt support amount of the first catalytic layer 12, to thereby allow for an enhanced anti-corrosiveness in the second catalytic layer 13.

According to the present embodiment, a double-layered cathode catalytic layer has a varied support amount of metallic catalyst therein, thereby allowing a reduced voltage drop accompanied by a reduced catalytic activity due to an oxidation of metallic catalyst, thus allowing for an enhanced durability of the fuel cell.

Fifth Embodiment

Embodiment Example 9

For a fifth embodiment, the cathode catalytic layer is double-layered in part.

Figure 11:
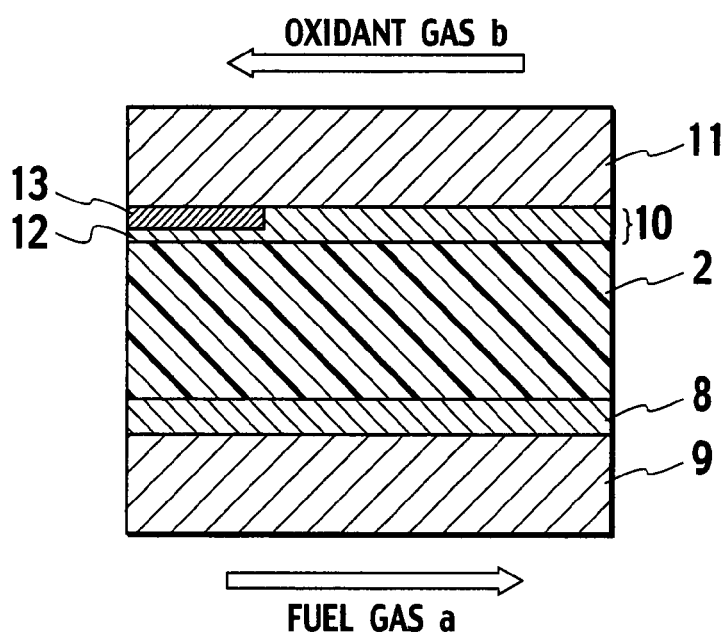
FIG. 11 is a sectional view of a membrane electrode assembly according to a fifth embodiment of the present invention.
Figure 12:
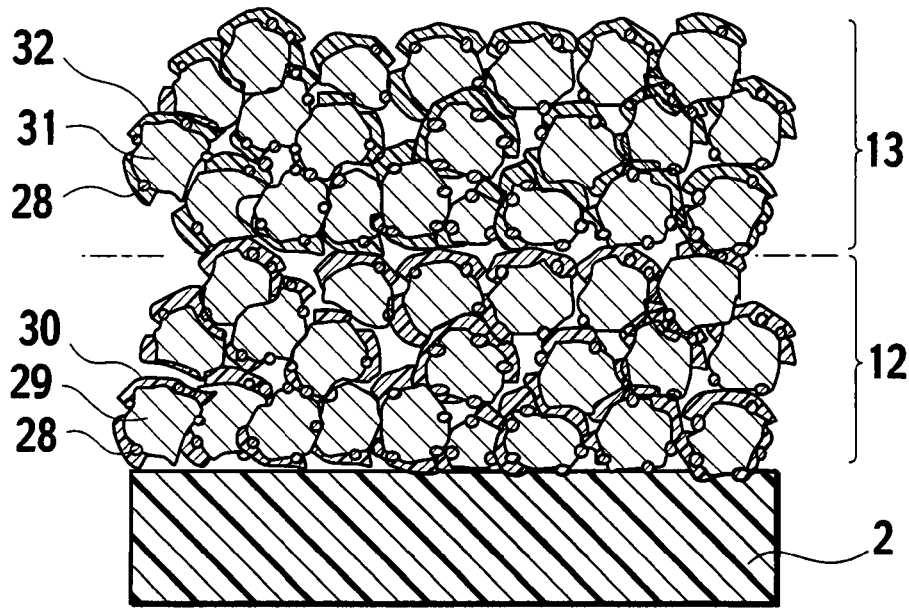
FIG. 12 is an enlarged sectional view of a double-layered catalytic layer shown in FIG. 11.

FIG. 11 is a sectional view of a membrane electrode assembly according to the fifth embodiment. A fuel gas a and an oxidant gas b are conducted in opposite directions, and the cathode catalytic layer 10 is locally double-layered in such a part that corresponds to a region opposing a vicinity of an upstream of the oxidant gas b. An enlarged section of the double-layered part of cathode catalytic layer 10 is shown in FIG. 12.

The cathode catalytic layer 10 is configured with a first catalytic layer 12 and a second catalytic layer 13, the second catalytic layer 13 being shorter in length. The first catalytic layer 12 is composed of a Ketjenblack 29 supporting Pt particles 28 thereon, with intervening electrolyte 30. On the other hand, the second catalytic layer 13 is composed of an acetylene black 31 supporting Pt particles 28 thereon, with intervening electrolyte 32. The Pt support amount is set greater in the second catalytic layer 13 than in the first catalytic layer 12, and Pt particles in the second catalytic layer 13 have a smaller average particle size than Pt particles in the first catalytic layer 12. For example, Pt particles in the first catalytic layer 12 may have an average particle size within a range of 2 nm to 3 nm, and Pt particles in the second catalytic layer 13 may have a greater average particle size within a range of 3 nm to 5 nm.

The combination of carbon carriers using a Ketjenblack 29 and an acetylene black (CP-250) 31 in the carbon catalytic layers 12 and 13 is not limited thereto, providing that carbon carriers in the second catalytic layer 13 have a higher oxidizing (corroding) potential or higher anti-corrosiveness than carbon carriers in the first catalytic layer 12.

It is noted that although the cathode catalytic layer 10 is partially double-layered in FIG. 11, an entirety of the cathode catalytic layer 10 may also be double-layered to be effective, as a matter of course. In addition, although the fuel gas a and the oxidant gas b are conducted in opposite directions in the example illustrated herein, which may be modified to have an oxidant gas b conducted in an identical direction to the fuel gas a.

Figure 13:
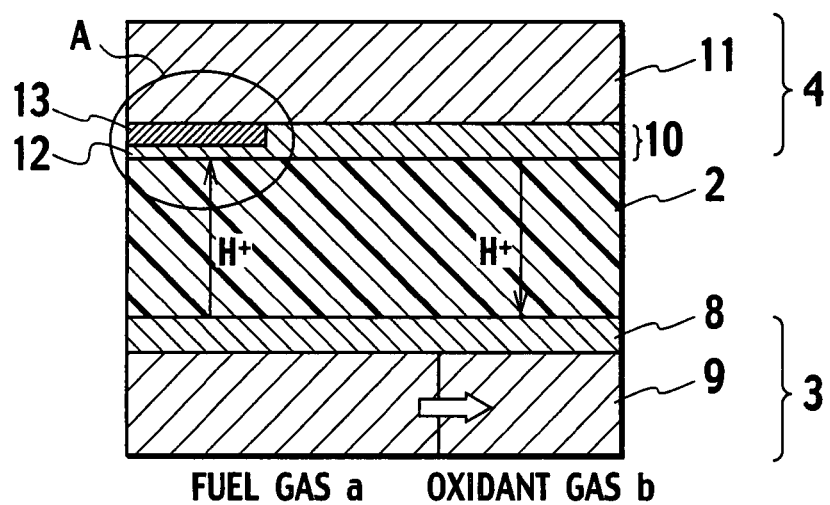
FIG. 13 is a diagram describing a movement of proton in a solid polymer electrolyte membrane in introduction of a fuel gas (hydrogen gas).

With a lapse of long interval of time after a stop of the fuel cell, the anode and the cathode may be exposed to the air. In a start of the fuel cell, typically, an intentional purge operation is exercised by using an inactive gas. However, assuming no purge operations by an inactive gas, the fuel cell may be started with the anode and the cathode exposed to air, and a fuel gas a (e.g. hydrogen gas) may be introduced to the anode, when protons move in a solid polymer electrolyte membrane 2, which will be described with reference to FIG. 13.

In the start of the fuel cell, as the fuel gas a (hydrogen gas) is introduced to the anode, the solid polymer electrolyte membrane 2 have different flux of protons ($H^+$) near an upstream of the fuel gas a and near a downstream of the fuel gas a. Near the upstream of fuel gas a, protons ($H^+$) move from the anode side to the cathode side, forming like flux of protons to a start of the fuel cell. On the other hand, near the downstream of fuel gas a, protons move from the cathode side to the anode side. It is noted that such movement of protons are disclosed in United States Patent USPAP2002/0076582.

Figure 14:
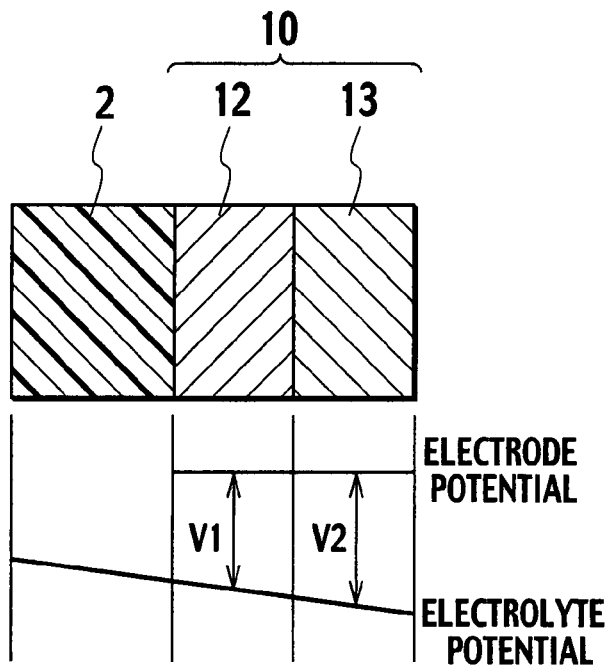
FIG. 14 is a diagram illustrating a potential distribution in a sectional direction in a vicinity of a cathode A in a region opposing a vicinity of an upstream of the fuel gas.

FIG. 14 is a diagram showing potential distributions in a sectional direction in a vicinal region A of the cathode to a region opposing a vicinity of the upstream of fuel gas a. Electrolyte has a potential distribution depending on flux of protons, as described with reference to FIG. 7 in the second embodiment, and the electrolyte potential is lower in the second electrode catalytic layer 13 than in the first electrode catalytic layer 12, giving the second electrode catalytic layer 13 an increased tendency for corrosion by oxidation. Accordingly, carbon carriers in the second electrode catalyst layer 13 have an enhanced anti-corrosiveness in comparison with the first electrode catalytic layer 12, and the Pt particles size is reduced to allow the Pt support amount to be increased, thereby allowing for an enhanced anti-corrosiveness of oxidizer electrode 4.

According to the present embodiment, by provision of a double-layered electrode catalytic layer in an oxidizer electrode in a region opposing a vicinity of an upstream of a fuel gas, this region is allowed to have a decreased tendency for corrosion by oxidation, even under a high potential to be developed upon introduction of a hydrogen gas in a start of the fuel cell. As a result, the fuel cell is allowed to have an enhanced durability even in the case of a repetition of start and stop of the fuel cell.

Sixth Embodiment

Embodiment Example 10

For a sixth embodiment, an improvement is provided to the membrane electrode assembly shown in the fifth embodiment.

Figure 15:
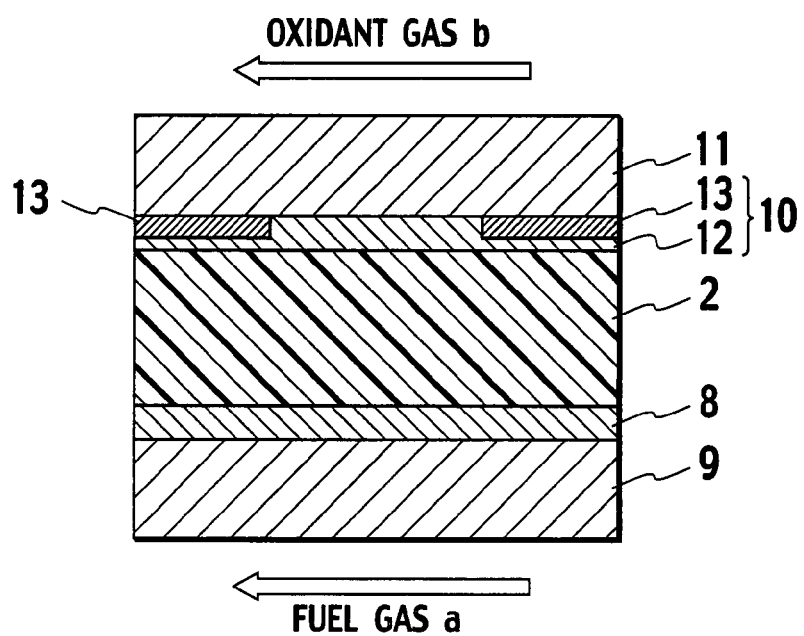
FIG. 15 is a sectional view of a membrane electrode assembly according to a sixth embodiment of the present invention.

FIG. 15 is a sectional view of a membrane electrode assembly according to the sixth embodiment. There is a cathode catalytic layer 10 double-layered in a region opposing a vicinity of an upstream of a fuel gas a at a cathode 4 side, and in a region vicinal to a downstream of an oxidant gas b. It is noted that although in FIG. 11, two-dimensionally, the fuel gas a and the oxidant gas b are introduced in opposite directions, the flows fuel gas a and oxidant gas b are not limited thereto, subject to a double-layered configuration of cathode catalytic layer 10 in accordance with flow directions of the fuel gas a and the oxidant gas b to be introduced.

A first catalytic layer 12 is composed of a Ketjenblack 21 supporting Pt particles thereon, with intervening electrolyte A, and on the other hand, a second catalytic layer 13 is composed of a graphitized Ketjenblack supporting Pt particles thereon, with intervening electrolyte B. The Pt support amount is set to be greater in the second catalytic layer 13 than in the first catalytic layer 12, and the ion exchange capacity of electrolyte (amount of protons in the electrolyte, unit (meq/g) is set to be greater for the electrolyte B than for the electrolyte A. The amount of electrolyte is defined in terms of a mass ratio to Pt support amount, and for the first catalytic layer 12, Pt:electrolyte A=1:1, and for the second catalytic layer 13, Pt:electrolyte B=1:0.9. The ratio of electrolyte amount and Pt support amount is an illustrative example, and not limited thereto. For electrolyte amount, the definition is made to Pt support amount, while the electrolyte amount may be defined to the mass of carriers.

Figure 16:
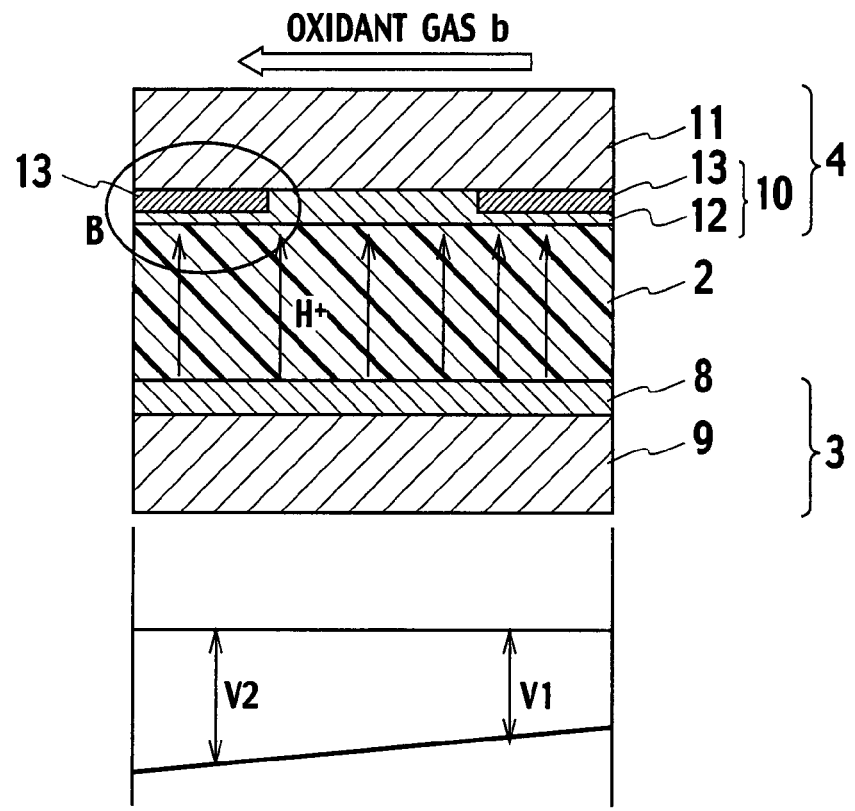
FIG. 16 is a diagram describing a movement of proton in a solid polymer electrolyte membrane in power generation of the fuel cell.

FIG. 16 is a sectional view of a membrane electrode assembly, describing movements of protons in a start of the fuel cell. Protons have a distribution of movements in the sectional direction of a solid polymer electrolyte membrane 2, which is identical to a current density distribution. The current density distribution depends on the oxygen concentration, i.e., the oxidant gas b's flow direction, and the degree of proton movements becomes greater in the upstream of oxidant gas b in comparison with the downstream of oxidant gas b. Further, with respect to the sectional direction of the solid polymer electrolyte membrane 2, electrolyte has a potential distribution, which is decreased from the upstream of oxidant gas b toward the downstream of oxidant gas b, like the degree of movements of protons. Further, due to fast movements of electrons, the oxidant gas b has a constant potential, whether in the upstream or downstream of oxidant gas b. As will be seen from such points, the voltage (potential difference) V2 in the downstream of oxidant gas b is greater than the voltage (potential difference) V1 in the upstream of oxidant gas b. Therefore, in a vicinity of the downstream of oxidant gas b, the cathode is exposed to an environment with an increased tendency for oxidation. However, the catalytic layer 10 in the cathode is now double-layered in a vicinity of the downstream of oxidant gas b, thus allowing for an enhanced anti-corrosiveness of cathode. In regard of the deterioration in a start of the fuel cell, it is noted that description of the fifth embodiment is still applicable.

Figure 17:
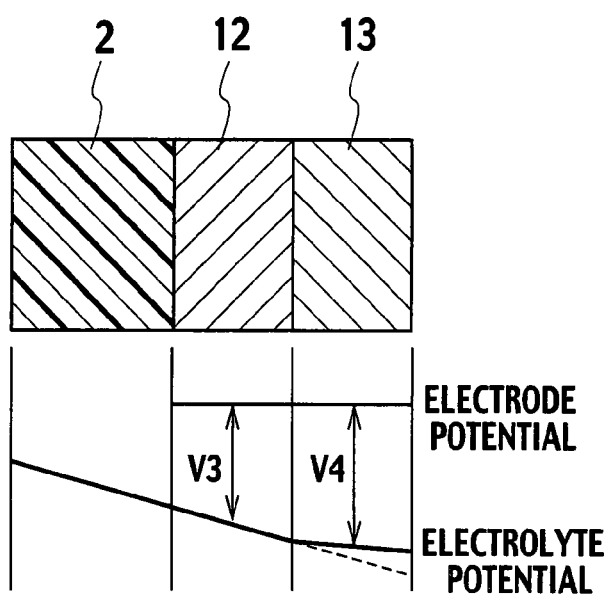
FIG. 17 is a diagram illustrating a potential distribution in a sectional direction in a vicinity B of a cathode in a vicinity of a downstream of an oxidant gas.

FIG. 17 is a diagram showing potential distributions in a sectional direction in a vicinal region B of cathode about the downstream of oxidant gas b. The potential distribution of electrolyte is established in accordance with flux of protons, and the electrolyte potential is lower in the second catalytic layer 13 than in the first catalytic layer 12. Therefore, the ion exchange capacity of electrolyte B in the second catalytic layer 13 is increased relative to electrolyte A in the first catalytic layer 12, to thereby suppress the reduction of electrolyte potential, allowing for an enhanced anti-corrosiveness of cathode.

Further, according to the present embodiment, at the downstream of oxidant gas b with an increased tendency for water to be residual, the amount of electrolyte B in the second catalytic layer 13 is decreased relative to electrolyte A in the first catalytic layer 12, to thereby suppress a flooding in the first catalytic layer 12.

Therefore, according to the present embodiment, by provision of a locally double-layered cathode catalytic layer, the anti-corrosiveness of cathode can be enhanced such as in introduction of a hydrogen gas in a start of the fuel cell or in power generation of the fuel cell, allowing for a suppressed high-potential state. As a result, the voltage drop due to a flooding can be reduced, allowing for provision of a fuel cell excellent in power generation performance.

Further, Pt particles are employed as catalyst particles herein, which are not limited to Pt particles, and may well be Ru, Rh, Pd, Ag, Ir, Pt, Au, or the like.

It is noted that although illustrative examples of double-layered cathode catalytic layers are shown in the second embodiment to the sixth embodiment, the cathode catalytic layer in the proton-exchange membrane fuel cell shown in the first embodiment may also be double-layered as a matter of course, to thereby allow for a yet enhanced anti-corrosiveness in the cathode catalytic layer.

The present application claims the benefit of priority based on Japanese Patent Application No. 2004-340318 filed on Nov. 25, 2004 and Japanese Patent Application No. 2005-299289, filed Oct. 13, 2005, of which the contents are incorporated herein by reference.

Although favorable modes of embodiment of the present invention have been illustrated, the present invention is not restricted to those modes of embodiment, and it will be apparent that artisan may devise varieties of other embodiment modes or modifications without departing from the scope of following claims.

INDUSTRIAL APPLICABILITY

According to the present invention, a polymer electrolyte fuel cell is allowed to prevent a corroding deterioration of carbon carriers in a cathode catalytic layer in start and stop of the fuel cell, allowing for an enhanced stable output even in a running over a long term, with a high industrial applicability.

The invention claimed is:

1. A polymer electrolyte fuel cell, comprising:
a solid polymer electrolyte membrane;
catalytic layers disposed on both sides of the solid polymer electrolyte membrane;
gas diffusion layers disposed outside the catalytic layers; and
separators disposed outside the gas diffusion layers,
wherein a cathode-sided catalytic layer of the catalytic layers comprises:
a carbon carrier comprising carbon having a mean lattice plane spacing $d_{002}$ of [002] planes calculated from an X-ray diffraction within a range of 0.343 nm to 0.358 nm, a crystallite size Lc within a range of 3 nm to 10 nm, and a specific surface area within a range of 200 $m^2$/g to 300 $m^2$/g;
catalyst particles containing platinum supported on the carbon carrier; and
an electrolyte;
wherein the carbon carrier comprises a carbon black having a mean particle size within a range of 12 nm to 15 nm, a bulk density within a range of 0.09 g/$cm^3$ to 0.13 g/$cm^3$, and an electrical resistivity within a range of 0.27 $\Omega$cm to 0.33 $\Omega$cm.

2. The polymer electrolyte fuel cell as claimed in claim 1, wherein the carbon carrier comprises an acetylene black having a mean lattice plane spacing $d_{002}$ of [002] planes calculated from an X-ray diffraction within a range of 0.343 nm to 0.355 nm, a crystallite size Lc within a range of 3 nm to 9 nm, a specific surface area within a range of 200 $m^2$/g to 280 $m^2$/g, a mean particle size within a range of 16 nm to 20 nm, a bulk density within a range of 0.10 g/$cm^3$ to 0.12 g/$cm^3$, and an electrical resistivity within a range of 0.290 $\Omega$cm to 0.32 $\Omega$cm.

3. The polymer electrolyte fuel cell as claimed in claim 1, wherein the catalyst particles occupy a proportion within a range of 30% to 70% in a mass conversion with respect to a total amount of the catalyst particles and the carbon carriers residing in the cathode catalytic layer, and the catalyst particle-supporting carbon carrier has a specific surface area within a range of 60 $m^2$/g to 200 $m^2$/g.

4. The polymer electrolyte fuel cell as claimed in claim 1, wherein the electrolyte in the cathode-sided catalytic layer and the solid polymer electrolyte membrane comprise perfluorocarbon polymers having sulfonic acid groups.

5. The polymer electrolyte fuel cell as claimed in claim 1, wherein the cathode-sided catalytic layer has an average thickness ranging 6 μm to 15 μm, and the catalyst particle-supporting carbon carrier has a proportion of existence within a range of 50% to 80% with respect to a total mass in which the electrolyte and the catalyst particle-supporting carbon carrier are summed up.

6. The polymer electrolyte fuel cell as claimed in claim 1, wherein, for an anode side, the catalytic layer has an average thickness ranging 2 μm to 10 μm, and the catalyst particle-supporting carbon carrier has a proportion of existence within a range of 50% to 80% with respect to a total mass in which the electrolyte and the catalyst particle-supporting carbon carrier are summed up.

7. The polymer electrolyte fuel cell as claimed in claim 1, wherein, for an anode side, the catalytic layer has an average thickness Ya thinner than an average thickness Yc of the cathode-sided catalytic layer.

8. The polymer electrolyte fuel cell as claimed in claim 1, wherein, for an anode side, the catalytic layer has an average thickness Ya with a relationship of Ya/Yc=0.1 to 0.6 to an average thickness Yc of the cathode-sided catalytic layer.

9. The polymer electrolyte fuel cell as claimed in claim 1, wherein the catalyst particles comprise a platinum alloy containing a metal selected from among ruthenium, rhodium, palladium, iridium, osmium, chromium, cobalt, and nickel.

10. The polymer electrolyte fuel cell as claimed in claim 9, wherein the platinum alloy has a mixing ratio (platinum/metal) of platinum and the metal ranging 3/1 to 5/1 in a mole ratio.

11. The polymer electrolyte fuel cell as claimed in claim 1, wherein, for an anode side, the catalytic layer comprises a carbon carrier having a specific surface area within a range of 300 $m^2$/g to 1,500 $m^2$/g, catalyst particles containing platinum supported on the carbon carrier, and an electrolyte.

12. The polymer electrolyte fuel cell as claimed in claim 1, wherein the cathode-sided catalytic layer comprises a first catalytic layer and a second catalytic layer, and carbon carriers in the second catalytic layer have a higher anti-corrosiveness in comparison with carbon carriers in the first catalytic layer neighboring the solid polymer electrolyte membrane.

13. The polymer electrolyte fuel cell as claimed in claim 12, wherein an electrolyte in the second catalytic layer has a greater ion exchange capacity in comparison with an electrolyte in the first catalytic layer.

14. The polymer electrolyte fuel cell as claimed in claim 12, wherein the second catalytic layer has a greater support amount of the catalyst particles therein in comparison with a support amount of the catalyst particles in the first catalytic layer.

15. The polymer electrolyte fuel cell as claimed in claim 1, wherein a double-layered catalytic layer of the cathode-sided catalytic layer is disposed in a region opposing a vicinity of an upstream of a fuel gas.

16. The polymer electrolyte fuel cell as claimed in claim 1, wherein a double-layered catalytic layer of the cathode-sided catalytic layer is disposed in a downstream region of an oxidant gas.

* * * * *